United States Patent Office 2,820,533
Patented Jan. 21, 1958

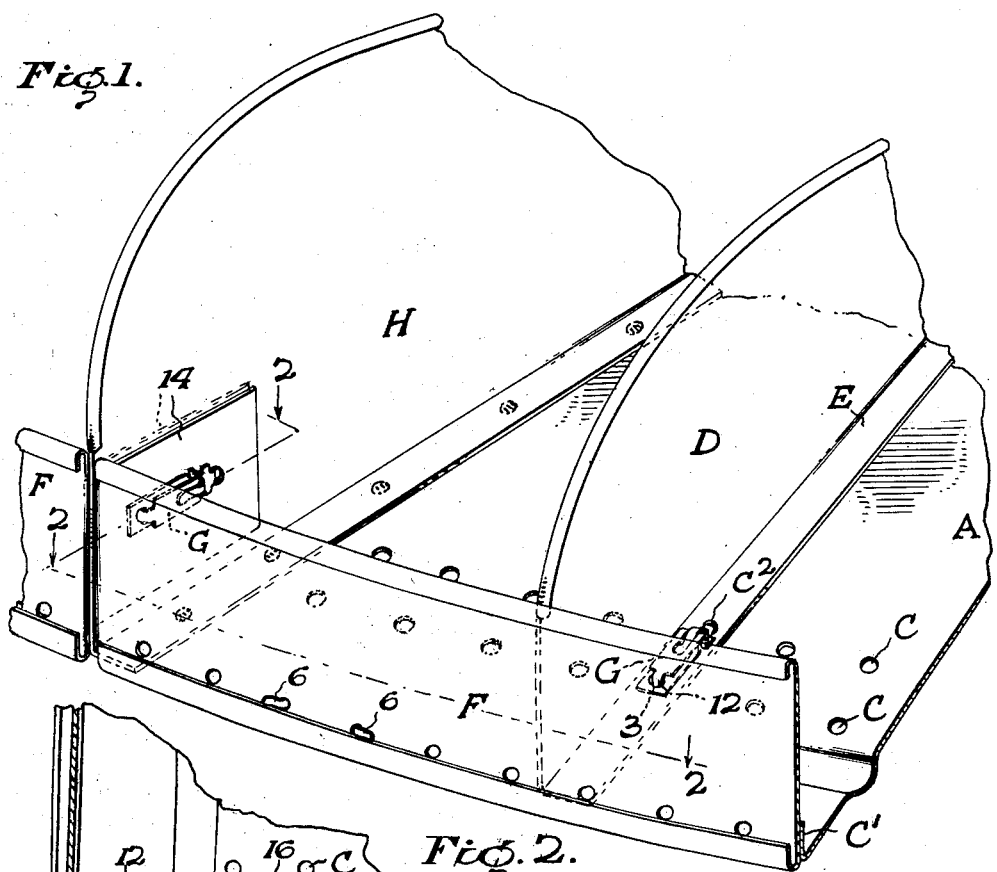
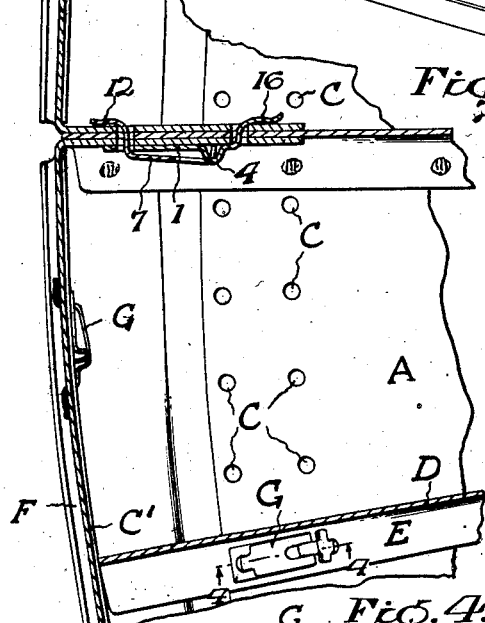
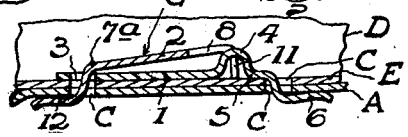

2,820,533

TWO-PIECE SNAP FASTENER

Edward H. Mount, Wellston, Ohio, assignor to The Frick-Gallagher Manufacturing Co., Wellston, Ohio, a corporation of Ohio Application September 2, 1954, Serial No. 453,730

4 Claims. (Cl. 189—36)

This invention relates to a two-piece fastener for connecting juxtaposed pieces of sheet material together.

More particularly the invention contemplates a two-part fastener useful for connecting dividers and bin fronts together in the manufacture of rotary shelving. In that connection, however, it will, of course, be understood that the fastener has utility wherever it is desired to securely and yet releasably connect a plurality of juxtaposed flat pieces, such as sheet metal, to dispense with screws, bolts, or similar fastenings.

Accordingly, a primary object of the invention is to provide a fastening consisting of parts which may be readily stamped from spring stock, and consists of a keeper element and a locking element which are complementary and may be interlocked by finger or thumb pressure to hold the juxtaposed elements together and hold the parts to be connected therebetween.

With the above and other objects in view which will more readily appear as the nature of the invention is better understood, the same consists in the novel construction, and arrangement of parts hereinafter more fully described, illustrated and claimed.

A preferred and practical embodiment of the invention is shown in the accompanying drawings, in which:

Fig. 1 is a fragmentary perspective view of a portion of a rotary shelf and a divider, with fastenings constituting the present invention in holding position at different locations.

Fig. 2 is a cross sectional view taken on the line 2—2 of Fig. 1.

Fig. 3 is an exploded perspective view of the elements constituting the improved fastener.

Fig. 4 is a detail cross-section taken on line 4—4 of Fig. 2.

Similar reference characters designate corresponding parts in the several figures of the drawings.

As will be observed from the drawing, the rotary bin is designated generally as A and its bottom is provided with one or more annular series of spaced openings C. Its outer edge is preferably flanged upwardly as indicated at C'. The divided D is provided with an angularly disposed flange E having a pair of spaced openings C² adapted to register with adjacent radially related openings C of each annular series. As shown, the bin front F may also be secured to both the bin bottom and a primary partition by the use of fasteners of the same type as those used to connect the flanges E to the bin bottom.

The two-piece fastener is designated generally as G and includes what may be conveniently termed a keeper member 1 and a locking member 2.

Referring first to the keeper member 1, it will be observed that the same includes a body portion having an opening 3 near one end while its opposite end is provided with a longitudinally arched and laterally notched keeper portion 4 which continues forwardly to provide a relatively flat bearing portion 5 aligned with the body, and is also provided with a projecting threading lug L including a shank 5a, which is substantially at right angles to the body, and a compound-curve tensioning tongue 6.

The locking element 2 includes a bifurcated body portion 7 which provides the parallel spaced spring arms 8 and 9 at each side of the longitudinal slot provided by the bifurcation. The ends of the arms 8 and 9 are turned downwardly as indicated at 10 to provide terminal key portions whose shanks have at their inner edges locking shoulders 11. The end of the body 7 opposite the locking fingers 10 is provided with an anchoring tail 12 also including a thickness compensating shank portion 7a disposed substantially at right angles to the body 7 while its terminal portion is in the form of a compound curve to tension the element 2.

The manner of applying the fastener in place is as follows:

Assuming a selected pair of openings C in the bin bottom and openings C² in the flange of the divider, or similar element, are in registry, the holding member 1 has its threading lug L inserted in one superimposed pair of registering openings so that the tensioning tongue 6 engages the underside of the bin bottom A while the body 1 overlies the top surface of the flange E (Fig. 4). In this position the opening 3 in the body 1 will register with the next adjacent superimposed openings C² and C. The locking element 2 may then have its anchoring tail portion 12 inserted in registering openings 3, C² and C so that said tail portion also engages the underside of the bin bottom A. Since the tail portion initially fits loosely in the registering openings, it may have a relatively free swinging vertical motion relative to the keeper member. With this motion available, the bifurcated body 7 of the locking element may be pressed downwardly until the keys 10 slide over the notched edges of the arched keeper portion 4 of the body 1 and finally the shoulders 11-11 snap behind the edges of keeper 4, thereby maintaining the locking element 2 firmly and securely interlocked with member 1 and uniting divider flange E with shelf A.

It will thus be seen that the present two-piece fastener has one part, namely the keeper 1 first put in place by having the lead lug L pass through registering openings C² and C, and then the locking member 7 is put in position by inserting the tail 12 through registering openings 3, C² and C, whereupon the body 7 may have pressure applied thereto to snap the locking shoulders 11 behind the keeper 4.

The fastener G holding the divided D to the bin bottom is shown in plan in Fig. 2. Also, this figure illustrates the application of the fastener G to hold the bin front F to the marginal Flange C' of the bin bottom. In this case, as in the case of Fig. 4, the two-piece fastener G connects the bin front F to the flange of the bin bottom by passing through two thicknesses of material.

As shown, the bin fronts F are arcuate members and have at their ends inturned flanges 14 which are intended to be secured to a permanent partition element H. The flanges 14 may be connected to the permanent partition H by one of the fastener units G as shown in perspective in Fig. 1, and in horizontal section in Fig. 2. In this situation the fastener passes through three thicknesses of metal. The resiliency of the members 1 and 2, as well as the resiliency in the lug L of member 1, and the yieldability of the tail 12 enable this type of fastener to readily connect more than two thicknesses of material.

The two-part fastener may be readily made by stamping procedures and includes a pair of reversely related members which, even before they are applied, are interlocked so as to hold them together. That is to say, the fastener includes the keeper member 1 and the locking member 2 each having at one end a resilient tensioning lug the tensioning lug or anchoring tail 12 of the locking member 2 normally passing through the opening 3 in the keeper member 1 so that the shoulders 11 of the keys 10 may be snapped over the notched narrowed portions of the arched keeper element 4. In preparing to use the two-piece fastener, the two members may be disconnected by exerting upward pressure on the locking member 2 to disengage the shoulders 11 from the keeper 4. The parts thus separated may be applied as heretofore indicated to hold the perforated sheet elements together.

I claim:

1. A two-piece snap fastener for connecting juxtaposed perforated sheets together, comprising, a keeper member including a body having an offset resilient lug at one end, an opening at the other end, and a medial longitudinally arched keeper portion; and a locking member including a body having a resilient anchoring lug at one end and laterally spaced parallel spring arms at the other end and offset in the same direction as the lug, and keys at the free ends of the arms, said keys having locking shoulders at their inner edges for interlocking engagement with said arched keeper portion.

2. A two-piece fastener for connecting juxtaposed perforated sheets together, comprising; a keeper body having an opening, an offset lug at one end of the body including a shank portion substantially at right angles to the body and a resilient terminal portion substantially parallel to the plane of the body, a keeper portion arched longitudinally of the body substantially adjacent the lug, said keeper portion having its marginal edges notched inwardly to provide a relatively narrow crown; and a locking member including a body having a resilient anchoring tail at one end and laterally spaced parallel spring arms at the other end, keys at the free ends of the arms offset therefrom in the same direction of the tail, and shoulders at the inner edges of the said keys for interlocking with the notched crown portion of the keeper member.

3. In a combination, a pair of sheet members each having at least a related pair of openings therein, said openings adapted to be placed in registry, a two-piece fastener connecting said sheets, said two-piece fastener comprising a keeper member having a lug at one end entering superimposed related registering openings and also provided with an opening therein opposite the lug, keeper means between the opening and the lug, a locking member having a lug entering the opening on the keeper member and through the other registering openings, spring arms on the locking member, and keys offset from said arms toward and engaging with the keeper means on the keeper member.

4. A two-piece snap fastener assembly for connecting juxtaposed perforated sheets, comprising, a keeper member having an opening, and a locking member, said members each terminating at one end in an integral resilient lug, the lug on the keeper member located at one end of the assembly and the lug on the locking member located at the opposite end of the assembly, and the lug on the locking member adapted to pass through the opening on the keeper member, longitudinally arched keeper means on the keeper member between the opening therein and the lug thereof, spring arms on the locking member spaced to receive said longitudinally arched keeper means, co-planar keys offset from the ends of said arms, and shoulders on the inner edges of said keys for engaging with said longitudinally arched keeper means on the keeper member.

References Cited in the file of this patent

UNITED STATES PATENTS

| | | |
|---|---|---|
| 1,772,886 | Critchley | Aug. 12, 1930 |
| 1,909,654 | Brown et al | May 16, 1933 |
| 1,995,370 | Walters | Mar. 26, 1935 |
| 2,585,900 | Van Buren, Jr. | Feb. 12, 1952 |